US006687617B2

(12) United States Patent
Kelly (10) Patent No.: US 6,687,617 B2
(45) Date of Patent: Feb. 3, 2004

(54) METHOD AND SYSTEM FOR MIGRATION OF SEISMIC DATA

(75) Inventor: Steve Kelly, Houston, TX (US)

(73) Assignee: PGS America, Inc., Houston, TX (US)

( * ) Notice: Subject to any disclaimer, the term of this patent is extended or adjusted under 35 U.S.C. 154(b) by 0 days.

(21) Appl. No.: 09/893,793

(22) Filed: Jun. 28, 2001

(65) Prior Publication Data

US 2003/0055567 A1 Mar. 20, 2003

(51) Int. Cl.$^7$ .............................. G01V 1/00; G01V 1/28
(52) U.S. Cl. ............................................. 702/14; 702/17
(58) Field of Search ........................ 702/14, 17; 367/57

(56) References Cited

U.S. PATENT DOCUMENTS

| 5,696,733 A | | 12/1997 | Zinn et al. | |
| 5,995,904 A | * | 11/1999 | Willen et al. | .................. 702/14 |
| 6,317,695 B1 | * | 11/2001 | Zhou et al. | .................... 702/17 |

OTHER PUBLICATIONS

"Compensating Finite–Difference Errors in 3–D Migration and Modeling", 10/91, Li in Geophysics, vol. 56, No. 10.*
"Migration of Seismic Data by Phase Shift Plus Interpolation", 2/84, Gazdag et al. in Geophysics, vol. 49, No. 2.*
"Wave Equation Migration with the Phase–Shift Method", 12/78, Gazdag in Geophysics, vol. 43, No. 7.*
Ralph Phillip Bording and Larry R. Lines, 1997, "Seismic Modeling and Imaging with the Complete Wave Equation," Course Notes Series No. 8, SEG.
Charles Cerjan, Dan Kosloff, Ronnie Kosloff and Moshe Reshef, 1985, "A nonreflecting boundary condition for discrete and elastic wave equations," Geophysics, 50, 4, 705–708.
Jon Claerbout, 1985, 1999, "Imaging the Earth's Interior," Blackwell Scientific Publications, Ltd.
Robert W. Clayton and Bjorn Engquist, 1980, "Absorbing boundary conditions for wave–equation migration," Geophysics, 45, 5, 895–904.
Jeno Gazdag, 1978, Wave equation migration with the phase–shift method: Geophysics, 43, 1342–1351.
E. Kjartansson, 1979, "Attenuation of seismic waves in rocks and applications in energy exploration," Ph.D. thesis, Stanford Univ.
Jeno Gazdag and Piero Sgua, zero, 1984, Migration of seismic data by phase shift plus . . . , Geophysics, 49, 124–131.
R. Kosloff and D. Kosloff, 1986, Absorbing Boundaries for Wave Propagation Problems, Journal of Computational Physics, 63, 363–376, Wave equation migration with the phase–shift method, Geophysics, 43, 1342–1351.
Myung W. Lee and Sang Y. Suh, 1985, "Optimization of one–way wave equations," Geophysics, 50, 10, 1634–1637.
Zhiming Li, 1991, "Compensating finite–difference errors in 3–D migration and modeling," Geophysics, 56, 10, 1650–1660.
Curtis Ober, Rob Gjertsen and David Womble, 1999, "Salvo: A Seismic Migration Code for Complex geology," A report prepared for members to the ACTI consortium, Sandia National Lab, Albuquerque, N.M.
Robert Stolt and Alvin Benson, 1986, "Seismic Migration: Theory and Practice, vol. 5" Geophysical Press.

* cited by examiner

Primary Examiner—John Barlow
Assistant Examiner—Toan M Le
(74) Attorney, Agent, or Firm—E. Eugene Thigpen (57) ABSTRACT

A method of migrating seismic data is provided. The seismic data has associated therewith a wavefield at a first level. The method comprises extrapolating the wavefield from the first level to a second level; correcting the extrapolated wavefield; computing intermediate sample points for an output image between the first and the second levels; computing a contribution to the wavefield at each intermediate sample point; and summing the contributions to the wavefield at each intermediate sample point.

48 Claims, 2 Drawing Sheets

METHOD AND SYSTEM FOR MIGRATION OF SEISMIC DATA

BACKGROUND OF THE INVENTION

The present invention relates to seismic data processing, and more particularly to a more rapid method of migrating seismic data for steeply-dipping reflectors and large lateral variations in velocity.

Typically, seismic data is arranged in arrays representing an acoustic signal received by sensors. Often the seismic data represents signal values as a function of geometric location and frequency content of the signal. Geological sensors, like geophones and hydrophones, measure the wavefields at a multitude of positions. The measured seismic data characterized by wavefields are processed to identify useful geological formations. One such processing step is called seismic data migration.

Seismic data migration requires solving the wave equation in the earth volume. Measured wavefield data points are used in conjunction with the wave equation to identify useful geological formations. It is well known in the art that the seismic data requires migration in order to restore the apparent positions of reflections to their correct locations (Claerbout[1], 1999; Stolt and Benson[2], 1986). Numerous techniques of seismic data migration are known in the art (Bording and Lines[3], 1997; Claerbout[4], 1999; Stolt and Benson[5], 1986). Different techniques provide differing degrees of accuracy. In general, more accurate methods require greater computational resources. In order to use available computer resources in a cost-effective manner, computation-intensive algorithms must be designed as efficiently as possible.

[1] Incorporated herein by reference.
[2] Incorporated herein by reference.
[3] Incorporated herein by reference.
[4] Incorporated herein by reference.
[5] Incorporated herein by reference.

Conventional finite difference methods of migration are valued for their accuracy, but they are computationally intensive. Because of its expense, the finite difference method is most appropriate for use in regions where the acoustic signal velocity strongly varies laterally, as well as with depth (or time).

Most conventional finite difference methods of migration represent "one-way" approximations of the two-way acoustic wave equation for constant density, which has the form:

$$\partial^2 P/\partial x^2 + \partial^2 P/\partial y^2 + \partial^2 P/\partial z^2 = (1/c^2)\partial^2 P/\partial t^2 \quad (1)$$

where

P=acoustic pressure, x, y, z=position coordinates, and c=acoustic velocity

Examples of known methods of finite difference solutions for the "two-way" wave equation can be found, for example, in Bording and Lines[6], 1997, and Smith, U.S. Pat. No. 5,999,488. These methods are particularly slow, since they independently account for downgoing and upgoing propagation of the wavefield. In addition, in order to use equation (1) effectively, the spatial distribution of the velocity, C(x, y,z), must be known very precisely. This level of precision is difficult to obtain. Thus, there is a long felt need for a method and system to retain the accuracy of the finite difference method at increased speed and reduced cost, without having a highly detailed knowledge of the spatial distribution for the propagation velocity.

[6] Incorporated herein by reference.

SUMMARY OF THE INVENTION

A method of migrating seismic data is provided. The seismic data has associated therewith a wavefield at a first level. The method comprises extrapolating the wavefield from the first level to a second level; correcting the extrapolated wavefield; computing intermediate sample points for an output image between the first and the second levels; computing a contribution to the wavefield at each intermediate sample point; and summing the contributions to the wavefield at each intermediate sample point.

A system for migrating seismic data is provided. The system comprises means for extrapolating a wavefield; means for correcting the extrapolated wavefield; means for computing intermediate sample points for an output image; means for computing a contribution to the wavefield at each intermediate sample point; and means for summing the contributions to the wavefield at each intermediate sample point.

DETAILED DESCRIPTION OF EXAMPLE EMBODIMENTS OF THE PRESENT INVENTION

Depth Migration

A method is provided for migrating seismic data. In one example embodiment of the present invention, a one-way equation is derived from equation (1) by taking spatial and temporal Fourier transforms and then choosing the positive root for downward extrapolation of the upgoing wavefield. Following the "exploding reflector" concept, two-way propagation for data is accommodated by dividing the velocity by two (Stolt and Benson[7], 1986; Claerbout[8] 1985, 1977). The resulting dispersion relation, which expresses the "one-way" wave equation in the domain of radial frequency ($\omega$) and wavenumbers ($k_x$, $k_y$, $k_z$) is given by:

$$k_z = (2\omega/c)\sqrt{1-[c/(2\omega)]^2(k_x^2+k_y^2)} \quad (2)$$

Equation (2) allows an exact extrapolation in the frequency-wavenumber domain under the assumption of constant velocity. This is the form commonly used in phase shift migration algorithms (Gazdag[9], 1978). However, when the velocity varies laterally, several constant-velocity extrapolations must be done. Interpolation is then used to compute the appropriate wavefield for each velocity (Gazdag and Sguazzero[10], 1984).

[7] Incorporated herein by reference.
[8] Incorporated herein by reference.
[9] Incorporated herein by reference.
[10] Incorporated herein by reference.

If equation (2) is converted back to the spatial domain, one obtains the square root of differential operators, which is not defined. One must thus seek approximations to the square root in equation (2) in order to obtain a solution in the spatial domain. Claerbout[11] (1985) invokes continued fractions in order to obtain explicit extrapolators that are appropriate for various maximum dips. The higher the dip in the data, the higher the order of the approximation that is required in order to accurately represent it. This approach yields implicit schemes that are stable, but are also costly.

[11] Incorporated herein by reference.

Ma[12] (1981) presented a compact way to factorize the rational approximation. Lee and Suh[13] (1985) applied a least-squares analysis in order to optimize the performance of Ma's rational approximation over a broader range of angles. In a further embodiment, from Lee and Suh, approximations accurate to order (2n) are given by:

$$\partial P/\partial z = (2j\omega/c)\left[1 + \sum_{i=1}^{n} \alpha_i S/(1 + \beta_i S)\right] P, \text{ where} \quad (3)$$

$$S = [c/2\omega]^2(\partial^2/\partial x^2 + \partial^2/\partial y^2), \quad j = \sqrt{-1}$$

and the coefficients $\alpha_i$ and $\beta_i$ are found in Table 1 of their paper. Thus, zeroth, second and fourth order approximations of equation (3) are respectively given by:

$$\partial P/\partial z = (2j\omega/c)P, \quad (4a)$$

$$\partial P/\partial z = (2j\omega/c)[1+\alpha_1 S/(1+\beta_1 S)]P, \quad (4b)$$

where $\alpha_1 = 0.478242060$,
$\beta_1 = 0.376369527$, and $$\partial P/\partial z = (2j\omega/c)[1+\alpha_1 S/(1+\beta_1 S)+\alpha_2 S/(1+\beta_2 S)]P, \quad (4c)$$

where $\alpha_1 = 0.040315157$,
$\beta_1 = 0.873981642$,
$\alpha_2 = 0.457289566$ and
$\beta_2 = 0.222691983$.

[12] Incorporated herein by reference.
[13] Incorporated herein by reference.

Equations (4a), (4b) and (4c) are referred to as "5," "65" and "80" degree approximations, respectively.

The role of the differential operators would become apparent if the rational expressions were factored out through multiplication by each denominator. This would result in derivatives of the form $\partial^2/\partial x^2(\partial P/\partial z)$ and $\partial^2/\partial y^2(\partial P/\partial z)$ for the second order approximation, and derivatives of the form $\partial^4/\partial x^4(\partial P/\partial z)$, $\partial^4/\partial x^2 \partial^2(\partial P/\partial z)$ and $\partial^4/\partial y^4(\partial P/\partial z)$ for the fourth order approximation. Representing these high-order derivatives is cumbersome and requires long operators.

Stolt and Benson[14] (1986) point out that the higher order solutions can be computed by successively solving each term in equations (4b) or (4c). This is sometimes referred to as "Marchuk splitting." Thus, in a further embodiment, for the fourth order solution, one would solve the following set of equations:

$$\partial P_0/\partial z = (2j\omega/c)P_0, \quad (5a)$$

$$\partial P_1/\partial z = (2j\omega/c)[\alpha_1 S/(1+\beta_1 S)]P_1, \text{ and} \quad (5b)$$

$$\partial P_2/\partial z = (2j\omega/c)[\alpha_2 S/(1+\beta_2 S)]P_2, \quad (5c)$$

where:

$P_0(\omega,x,y,z) = P(\omega,x,y,z)$,
$P_1(\omega,x,y,z) = P_0(\omega,x,y,z+dz)$,
$P_2(\omega,x,y,z) = P_1(\omega,x,y,z+dz)$, and
$P_3(\omega,x,y,z+dz) = P_2(\omega,x,y,z+dz)$.

Equation (5a) is the familiar thin lens term of depth migration, while equations (5b) and (5c) are diffraction corrections common to both time and depth migration.

[14] Incorporated herein by reference.

The derivatives associated with the common factor S in equations (5b) and (5c) lead to a coupling of the solution in the horizontal plane. This coupling increases the complexity and cost of the resulting difference equations (Claerbout[15], 1999), but in further embodiments, it is eliminated by separately solving the rational expressions in the x and y directions. Following Li[16] (1991) and Brown[17] (1983), in one example embodiment, equations (5b) and (5c) are represented in the following generic form:

$$\partial P_i/\partial z = (2j\omega/c)[\alpha_i S/(1+\beta_i S)] \cdot P_i. \quad (6)$$

Neglecting factors of the form $\partial^4/\partial x^2 \partial y^2$, in an even further embodiment, equation (6) is approximated by the following system:

$$\partial P_i/\partial z = (2j\omega/c)[\alpha_i S_x/(1+\beta_i S_x)]P_i, \text{ and} \quad (7a)$$

$$\partial P_i/\partial z = (2j\omega/c)[\alpha_i S_y/(1+\beta_i S_y)]P_i, \quad (7b)$$

where:

$S_x = [c/2\omega]^2 \cdot \partial^2/\partial x^2$ and $S_y = [c/2\omega]^2 \cdot \partial^2/\partial y^2$.

The differential operators in equation (7a) are now only a function of x, so, in a further embodiment, this equation is solved for each slice of data at constant y. Likewise, the differential operators in equation (7b) are only a function of y, so this equation is solved for each slice of data at constant x.

[15] Incorporated herein by reference.
[16] Incorporated herein by reference.
[17] Incorporated herein by reference.

The splitting discussed above neglects crossterms between derivatives in the x and y directions. This approximation is valid if structural variation is confined to one of the orthogonal coordinate axes. However, in the presence of true 3D structure, the approximation breaks down.

In still a further embodiment, combining equations (7a), (7b) and (3), the split extrapolation has the form:

$$\partial P/\partial z = (2j\omega/c)\left[1 + \sum_{i=1}^{n} \alpha_i S_x/(1+\beta_i S_x) + \sum_{i=1}^{n} \alpha_i S_y/(1+\beta_i S_y)\right]P, \quad (8)$$

where $S = [c/2\omega]^2(\partial^2/\partial x^2 + \partial^2/\partial y^2)$ and $j = \sqrt{-1}$.

Li[18] (1991) points out that errors associated with the splitting, the paraxial approximation and grid dispersion can be quantified in total by simply comparing the results of equation (8) with those one would obtain using the exact dispersion relation (equation 2). This concept forms the basis for a correction method that is intermittently applied during extrapolation, in order to adjust the phase of the wavefield.

In an even further embodiment, after rewriting equation (8) in terms of operator-equivalent wavenumbers and taking the difference between the exact extrapolator and equation (8), the phase error in radians per unit depth is given by:

$$\Phi(k_x, k_y, \omega) = \left(\frac{2\omega}{c}\right)\left\{\sqrt{1 - \left(\frac{c \cdot k_x}{2\omega}\right)^2 - \left(\frac{c \cdot k_y}{2\omega}\right)^2} - 1\right\} - \left(\frac{2\omega}{c}\right)\left\{\sum_{i=1}^{n}\frac{\alpha_i \cdot S_x}{(1+\beta_i \cdot S_x)} + \sum_{i=1}^{n}\frac{\alpha_i \cdot S_y}{(1+\beta_i \cdot S_y)}\right\}. \quad (9)$$

-continued where:

$$S_x = -\frac{(c/2\omega)^2 \hat{k}_x^2}{\left[1 - \lambda \cdot \hat{k}_x^2 \cdot (\Delta x)^2\right]},$$

$$S_y = -\frac{(c/2\omega)^2 \hat{k}_y^2}{\left[1 - \lambda \cdot \hat{k}_y^2 \cdot (\Delta y)^2\right]},$$

$$\hat{k}_x^2 = [2 - 2\cos(k_x \cdot \Delta x)]/(\Delta x)^2,$$

$$\hat{k}_y^2 = [2 - 2\cos(k_y \cdot \Delta y)]/(\Delta y)^2$$

and $$\lambda \cong \frac{1}{6}$$

is an empirical factor used to improve the accuracy of the spatial approximation for the second derivatives versus "x" and "y" (Claerbout[19], 1985, 1999).

[19] Incorporated herein by reference.

Equation (9) is written in the wavenumber domain, since differential operators are not defined within a square root. The wavenumbers with "hats" represent finite difference approximations to the true wavenumbers $k_x$ and $k_y$ (Claerbout[20], 1985, 1999), where $\Delta x$ and $\Delta y$ are discretization intervals in the "x" and "y" directions, respectively. In order for equation (9) to "make sense," there cannot be any quantities within it that vary laterally. In one embodiment, we assume that the velocity, c, is a constant for the extrapolation interval. A correction to account for the phase error is thus applied by performing a 2D FFT on the wavefield $P(x,y,z,\omega)$, multiplying $P(k_x,k_y,z,\omega)$ by $\Phi(k_x,k_y,\omega)$ and then solving the differential equation $$\partial P(k_x,k_y,z,\omega)/\partial z = i\Phi(k_x,k_y,107)P(k_x,k_y,z,\omega) \quad (10)$$

by a simple phase shift. In still a further embodiment, a final, 2D inverse FFT is required to return the solution to the spatial domain. For large lateral velocity variations, the correction is applied at selected reference velocities. The resulting wavefields are then interpolated versus velocity. In this capacity, "c" refers to one of many such reference velocities.

[20] Incorporated herein by reference.

In still further embodiments, the actual application of the phase correction is accomplished by noting that the solution to equation (10) will have the following form over a discrete depth interval, $\Delta z$ (Li[21], 1991).

[21] Incorporated herein by reference.

$$P_c(\omega, k_x, k_y, z + \Delta z) = P_c(\omega, k_x, k_y, z) \cdot \quad (11)$$

$$\exp\left\{\frac{2j\omega \cdot \Delta z}{c(z)}\left[\sqrt{1 - \left(\frac{k_x \cdot c(z)}{2\omega}\right)^2 - \left(\frac{k_y \cdot c(z)}{2\omega}\right)^2} - 1\right]\right\} \cdot$$

$$\prod_{i=1}^{n}\left(\frac{a_i + j \cdot b_i}{a_i - j \cdot b_i}\right) \cdot \prod_{i=1}^{n}\left(\frac{c_i + j \cdot d_i}{c_i - j \cdot d_i}\right),$$

where:

$$a_i = 1 - [\lambda(\Delta x)^2 + \beta_i \cdot (c(z)/2\omega)^2]\hat{k}_x^2,$$

-continued $$b_i = \frac{c(z) \cdot \alpha_i \cdot \Delta z \cdot \hat{k}_x^2}{2\omega},$$

$$c_i = 1 - [\lambda \cdot (\Delta y)^2 + \beta_i(c(z)/2\omega)^2]\hat{k}_y^2,$$

$$d_i = \frac{c(z) \cdot \alpha_i \cdot \Delta z \hat{k}_y^2}{2\omega}.$$

$P_c(z)$ refers to the phase-corrected field at depth "z" and $P_c(z+\Delta z)$ refers to the phase-corrected field at depth "z+$\Delta z$." In one embodiment, the phase correction is performed after extrapolation from depths "z" to "z+$\Delta z$," so $P_c(z)$ represents the extrapolated wavefield at depth "z+$\Delta z$." Since $|a_i+jb_i|/|a_i-jb_i|=1$ and $|c_i+jd_i|/|c_i-jd_i|=1$, the products of the complex ratios in equation (11) are represented by summations over phases, and $$P_c(\omega, k_x, k_y, z + \Delta z) = P_c(\omega, k_x, k_y, z) \cdot \quad (12)$$

$$\exp\left\{\frac{2j\omega \cdot \Delta z}{c(z)}\left[\sqrt{1 - \left(\frac{k_x \cdot c(z)}{2\omega}\right)^2 - \left(\frac{k_y \cdot c(z)}{2\omega}\right)^2} - 1\right] + 2 \cdot \sum_{i=1}^{n} \tan^{-1}\left(\frac{b_i}{a_i}\right) + 2 \cdot \sum_{i=1}^{n} \tan^{-1}\left(\frac{d_i}{c_i}\right)\right\},$$

where $a_i$, $b_i$, $c_i$ and $d_i$ are as given in equation (11).

At first glance, the operations required for the correction appear to be ominously expensive, particularly if the lateral velocity variation is severe. Those of ordinary skill in the art will recognize that rapid methods exist for computing 2D FFT's that exploit cache architectures on different types of systems. Despite this optimization, 2D FFT's still require considerable computation and are performed in alternate embodiments when necessary. Li[22] (1991) points out that the correction is typically very small and is only required every few depth steps. Under these circumstances, the correction only adds ~15% to the total runtime. Ober et al.[23] (1999) studied the behavior of the phase error versus frequency, velocity and propagation azimuth. They found that the correction is largest for small velocities, large frequencies and at a propagation azimuth of 45 degrees with respect to the crossline axis. Intuitively, we would also expect the correction to be more important at large wavenumbers, i.e., for high dips.

[22] Incorporated herein by reference.
[23] Incorporated herein by reference.

In an even further embodiment, an automated method is provided for determining when the correction must be applied in order to maintain a given minimum level of accuracy. Using L'Hopital's rule, we first approximate the "hatted" wavenumbers in equation (9) by their asymptotic forms, in the limit of small $\Delta x$ and $\Delta y$:

$$\lim_{\Delta x \to 0} \hat{k}_x = k_x \text{ and } \lim_{\Delta y \to 0} \hat{k}_x = k_x. \quad (13)$$

In an even further embodiment, we use equation (9) to estimate an upper bound for the phase error per unit depth by inferring that wavevector K at frequency $\omega$ is associated with a normally-incident reflection, from the steepest possible planar reflector, at the lowest possible velocity, for the sequence of extrapolations that have occurred since the last phase update.

In still a further embodiment, let $\zeta_1$ and $\zeta_2$ represent estimates of the steepest, apparent dips in the (x,z) and (y,z)

planes. Let δ represent the true dip of this steepest reflector and let φ be the azimuth subtended between the direction of true dip and the (x,z) plane. From structural geology, we know that:

$$\phi = \tan^{-1}\left[\frac{\tan\zeta_2}{\tan\zeta_1}\right], \text{ and} \tag{14a}$$

$$\delta = \tan^{-1}\left[\frac{\tan\zeta_1}{\cos\phi}\right]. \tag{14b}$$

With the above definitions, the wavevector K has the components:

$$k_x = |K|\sin\delta\cos\phi$$

$$k_y = |K|\sin\delta\sin\phi \text{ and}$$

$$k_z = |K|\cos\delta, \text{ where}$$

$$|K| = 2\omega/C_{min}. \tag{14c}$$

Substituting for $k_x$ and $k_y$ from equations (14c) and (13) into equation (12), we obtain:

$$|\Phi_{max}(\omega, \delta, \phi, z)| \simeq \tag{15}$$

$$\left|\frac{2\omega \cdot \Delta z}{C_{min}} \cdot (\cos\delta - 1) + 2\sum_{i=1}^{n}\left(\tan^{-1}\left(\frac{\tilde{b}_i}{\tilde{a}_i}\right) + \tan^{-1}\left(\frac{\tilde{d}_i}{\tilde{c}_i}\right)\right)\right|,$$

where $$\tilde{a}_i = 1 - [\lambda \cdot (\Delta x)^2 + \beta_i (C_{min}/2\omega)^2](2\omega/C_{min})^2 \cdot \sin^2\delta\cos^2\phi,$$

$$\tilde{b}_i = \alpha_i \cdot \Delta z \cdot (2\omega/C_{min})\sin^2\delta\cdot\cos^2\phi,$$

$$\tilde{c}_i = 1 - [\lambda \cdot (\Delta y)^2 + \beta_i \cdot (C_{min}/2\omega)^2](2\omega/C_{min})^2\sin^2\delta\cdot\sin^2\phi,$$

and $$\tilde{d}_i = \alpha_i \cdot \Delta z \cdot (2\omega/C_{min})\cdot\sin^2\delta\sin^2\phi$$

In still a further embodiment, for given estimates of the maximum apparent spatial dips in the (x,z) and (y,z)-planes, as given by $\zeta_1$ and $\zeta_2$, equations (14a), (14b) and (15) provide an upper limit on the associated phase error at any frequency. Thus, in a further embodiment, for a given pair of maximum apparent spatial dips and a maximum estimate of the phase error $\Phi_{max}$ from equation (15), a detailed phase correction can be performed by equation (11) when $\Phi_{max}$ exceeds some maximum allowable phase error E. In this capacity, the rapidly-computed upper bound from equation (15) is used to "trigger" the computation of a more accurate phase correction. In some embodiments, corrections will thus be required more often for higher frequencies and lower velocities, typically in the shallower part of the earth.

Time Migration

In yet a further embodiment, equations for time migration are easily obtained by replacing the differential operator over depth (δz) with an operator over one-way time [(c/2) δt]. The paraxial approximation of order "n" in depth (equation 3) thus becomes:

$$\partial P/\partial t = (j\omega)\left[1 + \sum_{i=1}^{n}\alpha_i S/(1+\beta_i S)\right]P, \text{ where} \tag{16}$$

$$S = [c/(2\omega)]^2(\partial^2/\partial x^2 + \partial^2/\partial y^2) \text{ and } j = \sqrt{-1}.$$

The solution for the first term is a simple phase shift of the form exp(jωt). The thin lens term of depth migration thus becomes a velocity-independent phase shift in time migration. The remaining diffraction terms, however, still depend on the velocity.

In an even further embodiment, equation (16) is expanded to the desired order of approximation and then solved by "Marchuk splitting," just as was discussed for depth migration.

A correction analogous to that of equations (11, 12) is applied in order to account for the paraxial (dip) approximation, grid dispersion, and neglecting cross-term derivatives (splitting). Likewise, in a further embodiment, an upper bound for the phase error is applied analogous to that by equation (15). In a further embodiment, the only difference between the relations for depth migration and those for time migration is the substitution of (c/2)Δt for Δz.

Absorbing Boundary

In practice, wave equation-based migration software is applied over a finite region, both laterally and in depth. Unless special care is taken, the boundaries of the solution region will generate bright, spurious reflections. For propagation in the frequency domain, the "reflections" are actually a form of wavefield "wraparound" that arises from the periodicity of the discrete Fourier transform. This wraparound is normally observed to originate from the bottom of the migrated section. In the spatial domain, reflections from the edges result from the implicit assumption of zero impedance beyond the boundary. Alternatively, they can be viewed as the inevitable "swings" that result from the migration of abrupt data truncations.

We address each of these undesirable phenomena in different ways. In one embodiment, Fourier-based wraparound is combated by removing an averaged estimate of the imaged portion of the wavefield from the total wavefield, prior to extrapolation to the second depth (Kjartansson[24], 1979; Li[25], 1991). This method, however, typically has the undesirable effect of also removing some signal that contributes to deeper image locations.

[24] Incorporated herein by reference.
[25] Incorporated herein by reference.

In an alternate embodiment, we implement a method suggested by Claerbout[1] (1985, 1979). This method consists of filtering all time dips in the data that exceed a theoretically-determined maximum. This maximum is given by the time dip of a diffraction hyperbola, at the end of the data length, whose apex lies at the current extrapolation time.

[26] Incorporated herein by reference.

In even further alternate embodiments, reflections from the side boundaries are addressed through two separate techniques. In the first technique, the amplitude of the wavefield is weighted by an exponential function over a small zone of ten to twenty grid points along each side (Cerjan et al. [27], 1985). In a later paper, Kosloff and Kosloff[28] (1986) developed a damped form of the wave equation. They showed that solutions of this differential equation are consistent with exponential damping. In a further embodiment, the desired absorption fraction over "n" grid points is represented by "γ." The weight for grid point "i" at the left edge is then given by:

$$ampwt_i = \exp\left\{[(n-i)/n]\frac{\log_{10}(1-\gamma)}{\log_{10}e}\right\} \quad (17)$$

Over the span of "n" grid points, the amplitude is thus reduced by a factor of $(1-\gamma)$. In still a further embodiment, a similar expression is applied for attenuation at the right edge.

[27] Incorporated herein by reference.
[28] Incorporated herein by reference.

In the second technique, we invoke a method to suppress edge reflections from work done by Clayton and Engquist[29] (1980). They derived coefficients that can be used in the conventional finite difference schemes for 15 and 45 degree paraxial approximations. Since the latter is applied in a standard, implicit form, it is easily extended to higher order paraxial approximations.

[29] Incorporated herein by reference.

In an even further example embodiment, a method is provided for migrating seismic data points. The seismic data has a wavefield at a first level associated therewith. The wavefield is a function of position coordinates and wavefield frequencies. The method of one example embodiment comprises: extrapolating the wavefield at a first level to seismic data points at a second level, wherein a phase error is generated for each frequency of the wavefield, and wherein an extrapolated wavefield results. The method further comprises computing and applying an accumulated phase error for the extrapolated wavefield if a rapidly-computed upper bound for the phase error exceeds a preset error tolerance limit, wherein a corrected wavefield results. The method further comprises imaging all points at the second level from the corrected wavefield, whereby migrated data points result.

Those of ordinary skill in the art will immediately recognize that in various embodiments, the first level comprises the first level of a single iteration and in each successive iteration a new level becomes the first level.

In still a further embodiment, the wavefield at a level comprises acoustic pressure, particle displacement of particle velocity at that depth in the earth volume under consideration, including information concerning the frequency spectrum of the wavefield. A level in the earth volume comprises positions of all data-points located at a particular depth (for depth migration), or all data-points located at depths corresponding to the same time of travel of the acoustic signal (for time migration).

In alternate embodiments of the present invention, the seismic data points comprise common midpoint stacked seismic data points, weighted stacked seismic data points, DMO-stacked seismic data points, trimmed stacked seismic data points, median stacked seismic data points, uphole stacked seismic data points, or any other stacked seismic data point that will occur to those of ordinary skill in the art. In further alternate embodiments, unstacked seismic data is migrated.

Also in further alternate embodiments, the seismic data will have been acquired from an earth volume associated with varying propagation velocity. In various alternate embodiments, the propagation velocity will be laterally-varying propagation velocity, depth-varying propagation velocity, time-varying propagation velocity, or any other propagation velocity that would occur to those of ordinary skill in the art.

In a still another embodiment of the method, the wavefield comprises recorded wavefield frequencies of interest. In a further embodiment, the selection of wavefield frequencies of interest is based on experience concerning the significance of contribution of individual wavefield frequencies to the migration process.

In still another embodiment, the seismic data comprises a finite set of discretized position coordinates $x_i$, $y_j$, and $z_0$. In still a further embodiment, extrapolating further comprises extrapolating Cartesian coordinate-based data; whereby the seismic data is depth migrated. In yet another embodiment, positive depth direction is towards the increasing depth. In still another embodiment, positive depth direction is towards the decreasing depth.

In a further embodiment, the wavefield corresponding to the seismic data points for depth migration, is defined as:

$$P^0{}_{i,j,k,l} = P(x_i, y_j, z_0, \omega_l) \quad (18)$$

for all i, j and l.

In still another embodiment, the seismic data comprises position coordinates of $x_i$, $y_j$, and initial time $\tau_0$. In yet another embodiment, extrapolating further comprises extrapolating time-based data, whereby the seismic data is time migrated. In still another embodiment, positive depth direction is towards increasing time. In yet another embodiment, positive depth direction is towards decreasing time. The wavefield corresponding to the seismic data points, for example for time migration, is defined as:

$$P^0{}_{i,j,k,l} = P(x_i, y_j, \tau_0, \omega_l) \text{ for all i,j and l.} \quad (19)$$

In still a further embodiment, the phase error comprises phase error in a diffraction term. In still a further embodiment, the extrapolation of the wavefield comprises finite difference extrapolating, or any other alternative formulations that would occur to those of skilled in the art. In some embodiments, the phase error arises only for the diffraction term and only when the "two-way" wave equation has been approximated by an angle limited, "one-way" expression or when splitting methods are used to obtain a solution in 3D.

In yet another embodiment, the extrapolating the wavefield comprises extrapolating a thin lens term and extrapolating a diffraction term for all seismic data points at the first level to seismic data points at the second level, and wherein the difference between the first level and the second level defines an extrapolation interval. In a still further embodiment, the extrapolating the wavefield further comprises combining extrapolation due to the thin lens term and extrapolation due to the diffraction term into a single phase shift extrapolation for those extrapolation intervals over which the earth's velocity is approximately constant.

In a further embodiment, the differential equation for the thin lens term in depth migration is given by equation (5a), and the corresponding extrapolation equation is accomplished through a simple phase shift. In discrete difference form, this solution is given by:

$$P^1{}_{i,j,k+1,l} = P^0{}_{i,j,k,l} * \exp(2i\omega_l \delta z / c_{i,j,k}) \quad (20)$$

wherein the varying velocity function is $c_{i,j,k} = c(x_i, y_j, z_k)$, $\omega_l$ is the angular frequency of the $l_{th}$ frequency component of the wavefield, and $\delta z$ is the depth sample interval for the output image file. In another embodiment, the differential equation that governs the thin lens term for time migration is similar to equation (5a), and the extrapolation equation is given by its solution. Using forward differences:

$$P^1{}_{i,j,k+1,l} = P^0{}_{i,j,k,l} \exp(i\omega_l \delta\tau), \quad (21)$$

wherein $\delta\tau$ is the time sample interval for the output image file.

In an even further embodiment, extrapolation equations for the split diffraction terms in the 65 degree approximation for depth migration are given by:

For each constant y-slice:

$$(A)P_{i-1,j,k+1,l}^2 + (1-2A)P_{i,j,k+1,l}^2 + (A)P_{i+1,j,k+1,l}^2 = (A^*)P_{i-1,j,k,l}^1 + (1-2A)^* P_{i,j,k,l}^1 + (A^*)P_{i+1,j,k,l}^1, \quad (22a)$$

where $$A = \frac{\beta_1 \cdot C_{ijk}^2}{4\omega_l^2 (\Delta x)^2} + \lambda - \frac{j \cdot \alpha_1}{4} \cdot \frac{C_{ijk}(\Delta z)}{\omega_l (\Delta x)^2}, \quad (22b)$$

where $j=\sqrt{-1}$,
$\alpha_1=0.478242060$,
$\beta_1=0.376369527$ and the superscript "*" refers to complex conjugate.

For each constant x-slice, $$(A)P_{i,j-1,k+1,l}^3 + (1-2A)P_{i,j,k+1,l}^3 + (A)P_{i,j+1,k+1,l}^3 = (A^*)P_{i,j-1,k,l}^2 + (1-2A)^* P_{i,j,k,l}^2 + (A^*)P_{i,j+1,k,l}^2, \quad (23a)$$

where:

$$A = \frac{\beta_1 \cdot c_{ijk}^2}{4\omega_l^2 (\Delta y)^2} + \lambda - \frac{j \cdot \alpha_1}{4} \cdot \frac{c_{ijk}(\Delta z)}{\omega_l (\Delta y)^2}, \quad (23b)$$

and j, $\alpha_1$, and $\beta_1$ are the same as in equation (22b).

In an even further embodiment, in the case of the 80° dip approximation, equations (22a) and (23a) are solved twice, first for $\alpha_1=0.040315157$, $\beta_1=0.873981642$. For the second pass, $\alpha_2=0.457289566$ and $\beta_2=0.222691983$ are substituted for $\alpha_1$ $\beta_1$ respectively.

In an even further embodiment, the difference equations for extrapolation in time migration are the same as equations (22) and (23) when $\Delta z = C_{ijk}\Delta t/2$. In this context, the extrapolation is now over the time interval At. In still a further embodiment, the individual extrapolations for both the thin lens term and the diffraction term are combined into a single phase shift extrapolation for those depth or time intervals over which the acoustic velocity is approximately constant. This technique is helpful for migrating data for some areas of the earth, e.g. the sea.

Seismic data typically shows a reduction in the maximum frequency with increasing time, due to inelastic attenuation in the earth, wherein the lost energy is converted to heat. In an even further embodiment, this maximum frequency is determined through acoustic signal spectral analysis. Since the migration is performed in the frequency domain, the profile of maximum frequency versus time or depth thus serves as input for time migration or depth migration, respectively.

Since in some embodiments, the extrapolation of the diffraction and thin lens terms, (as well as imaging discussed later), must be performed separately for each frequency, substantial computation time is saved by restricting the range of frequencies over which these computations are performed. The deeper extrapolations run faster than the shallow extrapolations.

In a further embodiment of the method, the extrapolating the wavefield further comprises "Marchuk splitting." In another embodiment of the method, extrapolating the diffraction term comprises extrapolating a split diffraction term for seismic data points on each constantly slice and extrapolating the split diffraction term for seismic data points on each constant-x slice.

In a further embodiment of the method, the selection of the highest wavefield frequency of interest comprises selecting the highest wavefield frequency of interest based on a spectral analysis of the wavefield at each extrapolation level. In a further embodiment of the method, the highest wavefield frequency of interest comprises frequency as a function of depth. In a further embodiment of the method, the highest wavefield frequency of interest comprises frequency as a function of time. In a further embodiment of the method, the determination of the variable size extrapolation interval further comprises computing the extrapolation interval based on the highest wavefield frequency of interest.

The physics that determines the maximum possible extrapolation interval step size, in the context of one embodiment using a variable-size extrapolation interval, is based on aliasing theory for the diffraction term. The thin lens term is computed exactly for each sample interval at imaging time and is not interpolated between extrapolation levels. The diffraction term, however, is interpolated between extrapolation intervals.

In an even further embodiment, the governing equations that determine the maximum allowable extrapolation interval are given by:

(24) For depth migration:

$$\Delta z(z) \leq \frac{0.25 \cdot C_{\min}(z)}{f_{\max}(z) \cdot (1 - \cos\phi)},$$

where $\Delta z$=extrapolation interval size beginning at depth z, or a first level, $C_{min}$=minimum velocity over all (x,y) at depth z, or a first level, $f_{max}$=maximum frequency at depth z, or a first level, and $\phi$=an estimate of the maximum spatial dip for the entire problem.

The maximum spatial dip, $\phi$, is computed using velocity and apparent maximum spatial dips in the (x,z) and (y,z) planes using equations (14a) and (14b).

(25) For time migration:

$$\Delta t(t) \leq \frac{0.50}{f_{\max}(t) \cdot (1 - \cos\phi)},$$

where $\Delta t$=extrapolation interval size beginning at time t, $f_{max}$=maximum frequency at time t, and $\phi$=an estimate of the maximum spatial dip for the entire problem.

In still another embodiment of the method, the computing the accumulated phase error comprises summing all phase errors. In yet another embodiment of the method, the applying a phase correction comprises applying a phase correction after migration for each extrapolation interval. In still another embodiment of the method, the applying a phase correction comprises applying the appropriate phase correction after migrating for a selected number of extrapolation intervals. Rather than using an error criterion for applying the phase correction, we apply the correction on a regular basis over "n" extrapolation intervals. The choice of "n" is determined by testing and can be as small as 1 and as large as 5 or more. Since in various embodiments, the size of the extrapolation intervals increase with time or depth, the total interval over which the phase correction is applied also increases, even though it is applied on a regular basis.

In a still further embodiment of the method, the preset error tolerance comprises selecting a limiting value of the preset error tolerance to suit migration accuracy requirements. In yet a further embodiment of the method, the preset error tolerance is zero.

Figure 1:
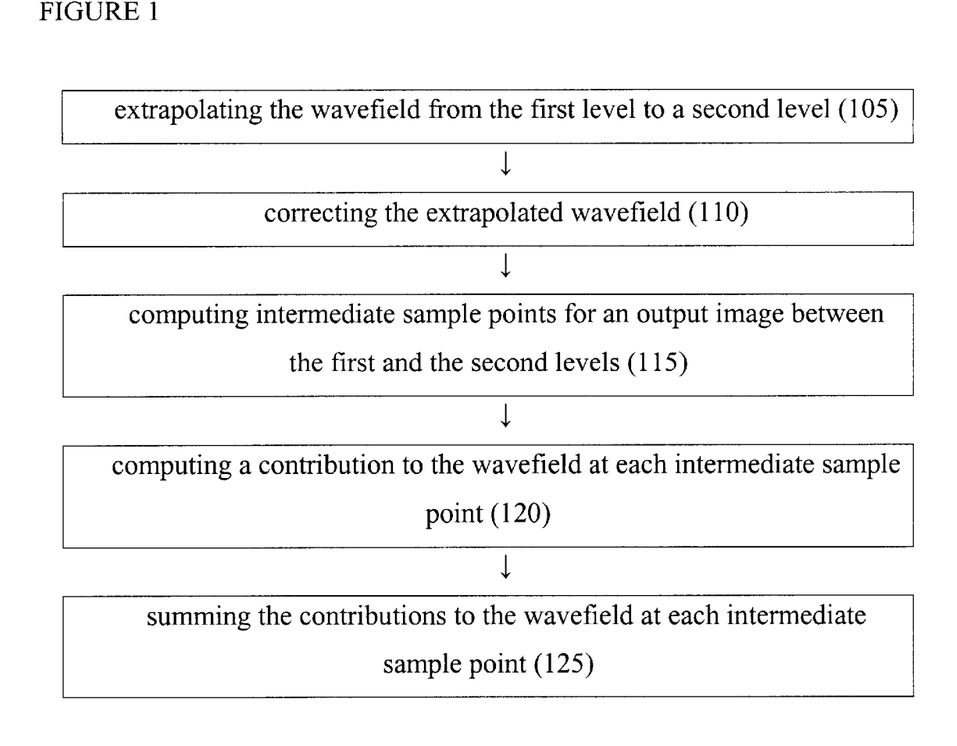
FIG. 1 is a diagram of an example method embodiment of the present invention.

In an even further embodiment of the present invention, illustrated in FIG. 1, a method of migrating seismic data is provided. The seismic data has associated therewith a wavefield at a first level. The method comprises extrapolating the wavefield from the first level to a second level (105); correcting the extrapolated wavefield (110); computing intermediate sample points for an output image between the first and the second levels (115); computing a contribution to the wavefield at each intermediate sample point (120); and summing the contributions to the wavefield at each intermediate sample point (125).

In an even further embodiment, summing (125) constitutes a "zero time" imaging condition. In still a further embodiment, the method further comprises transforming the seismic data from the time domain to the temporal-frequency domain prior to the extrapolating, and transforming the extrapolated seismic wavefield from the temporal-frequency domain back to the time domain in the summing operation.

In an even further embodiment, the method comprises transforming the seismic data from the spatial domain to the wavenumber domain prior to the extrapolating and transforming the extrapolated seismic wavefield from the wavenumber domain back to the spatial domain prior to summing.

In an even further embodiment of the method, the second level is deeper than the first level. In an even further embodiment, the extrapolating (105) further comprises applying a discrete difference equation for the diffracted part of the wavefield. In still a further embodiment, the applying a discrete difference equation further comprises generating a phase error for each frequency of the wavefield. In an even further embodiment, the phase error further comprises phase error for a diffraction term.

In an even further embodiment, the correcting the extrapolated wavefield (110) further comprises computing an accumulated phase correction for the extrapolated wavefield, when a rapidly-computed estimate of an upper bound for a phase error exceeds a preset error tolerance limit.

In an even further embodiment, the computing intermediate values for an output image (115) further comprises interpolating a phase-corrected, diffraction part of the wavefield. In an even further embodiment, the computing a contribution to the wavefield at each intermediate sample point (120) further comprises applying a thin lens term to the interpolated wavefield by repeated phase shifts over the output image sample increment.

In an even further embodiment, summing the contributions to the wavefield at each intermediate image sample point (125) further comprises summing the contributions to the wavefield from each frequency. In an even further embodiment, the wavefield further comprises wavefield frequencies of interest. In an even further embodiment, the extrapolating the wavefield (105) comprises extrapolating a thin lens term and extrapolating a diffraction term from a first level to a second level, wherein the difference between the first level and the second level defines an extrapolation interval.

In an even further embodiment, extrapolating the thin lens term and extrapolating the diffraction term further comprises extrapolating the thin lens term and the diffraction term in a single phase shift for extrapolation intervals over which a propagation velocity variation is within a pre-selected limit.

In an even further embodiment, determining the extrapolation interval comprises determining a variable size extrapolation interval. In an even further embodiment, the determining the variable size extrapolation interval comprises applying equation (24). In an even further embodiment, determining the variable size extrapolation interval comprises applying equation (25).

In still an even further embodiment, selecting the highest wavefield frequency of interest comprises selecting the highest wavefield frequency of interest based on a spectral analysis of the wavefield frequencies at the first level. In an even further embodiment, selecting the highest wavefield frequency of interest comprises selecting the highest wavefield frequency of interest based on a spectral analysis of the wavefield frequencies at the first level. In an even further embodiment, determining the variable size extrapolation interval further comprises computing the extrapolation interval based on the highest wavefield frequency of interest. In an even further embodiment, correcting the extrapolated wavefield comprises applying a preset phase correction after migrating at least one extrapolation interval. In an even further embodiment, the preset error tolerance comprises selecting a limiting value of the preset error tolerance to suit migration accuracy requirements. In an even further embodiment, the preset error tolerance is zero. In an even further embodiment, the method further comprises imaging, wherein the imaging comprises computing an imaged contribution of the wavefield at the the first level. In an even further embodiment, the imaging further comprises summing contributions of the wavefield frequencies at the first level. In an even further embodiment, the imaging further comprises normalizing the imaged data points.

In still a further embodiment, in its simplest form, the imaging equation at the first depth for all x and y is given by:

$$I_{i,j,k} = \frac{1}{(l_{max}+1)} \sum_{l=1}^{l_{max}} P^3_{i,j,k,l}, \tag{26}$$

where $l_{max}$ is the index of the highest frequency.

In a further embodiment, the imaging step (equation 26) is preceded by the following additional operations:

(1.) Linear interpolation between $P_{i,j,k,l}^3$ and $P_{i,j,k+1,l}^3$ to find $P^3$ at each intermediate sample value between depths (or times) $z_k$ and $z_{k+1}$ (or $\tau_k$ and $\tau_{k+1}$).

(2.) Extrapolation of $P_{i,j,k,l}^3$ to depth $z_{k+1}$ and all intermediate depths between $z_k$ and $z_{k+1}$ (or $\tau_k$ and $\tau_{k+1}$) by the thin lens term.

Figure 2:
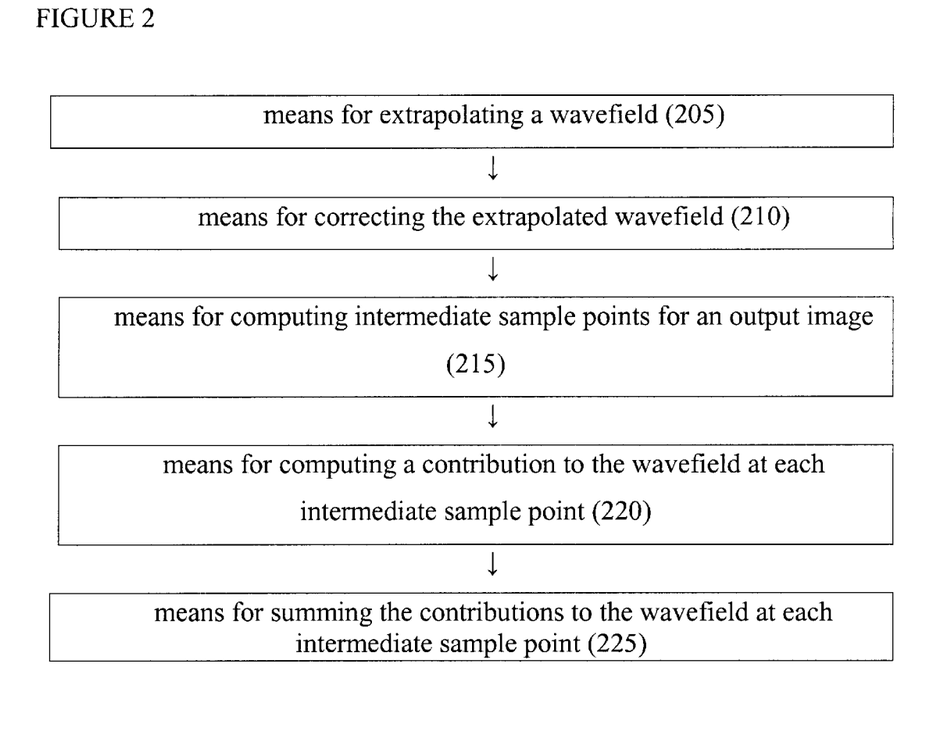
FIG. 2 is a diagram of an example system embodiment of the present invention.

In still a further embodiment, a system for migrating seismic data is provided. One example embodiment of the system is illustrated in FIG. 2. The system comprises means for extrapolating a wavefield (205). In alternate embodiments, means for extrapolating a wavefield (205) comprises a computer, a workstation, software running on any computer or workstation, or any other means that will occur to those of ordinary skill in the art. The system further comprises means for correcting the extrapolated wavefield (210). In alternate embodiments, means for correcting the extrapolated wavefield (210) comprises a computer, a workstation, software running on any computer or workstation, or any other means that will occur to those of ordinary skill in the art. The system further comprises means for computing intermediate sample points for an output image (215). In alternate embodiments, means for computing intermediate sample points for an output image (215)

comprises a computer, a workstation, software running on any computer or workstation, or any other means that will occur to those of ordinary skill in the art. The system further comprises means for computing a contribution to the wavefield at each intermediate sample point (220). In alternate embodiments, means for computing a contribution to the wavefield at each intermediate sample point (220) comprises a computer, a workstation, software running on any computer or workstation, or any other means that will occur to those of ordinary skill in the art. The system further comprises means for summing the contributions to the wavefield at each intermediate sample point (225). In alternate embodiments, means for summing the contributions to the wavefield at each intermediate sample point (225) comprises a computer, a workstation, software running on any computer or workstation, or any other means that will occur to those of ordinary skill in the art.

In an even further embodiment, the system further comprises means for transforming the seismic data from the time domain to the temporal frequency domain. In alternate embodiments, means for transforming the domain of seismic data comprises a computer, a workstation, software running on any computer or workstation, or any other means that will occur to those of ordinary skill in the art.

In another embodiment, the system further comprises means for transforming the seismic data from the spatial domain to the frequency wavenumber domain. In alternate embodiments, means for transforming the domain of seismic data comprises a computer, a workstation, software running on any computer or workstation, or any other means that will occur to those of ordinary skill in the art.

In an even further embodiment, the means for extrapolating (205) further comprises means for applying a discrete difference equation. In alternate embodiments, means for applying a discrete difference equation comprises a computer, a workstation, software running on any computer or workstation, or any other means that will occur to those of ordinary skill in the art. In an even further embodiment, the means for correcting the extrapolated wavefield (210) further comprises means for computing an accumulated phase correction for the extrapolated wavefield, when a rapidly-computed estimate of an upper bound for a phase error exceeds a preset error tolerance limit. In alternate embodiments, means for computing an accumulated phase correction for the extrapolated wavefield comprises a computer, a workstation, software running on any computer or workstation, or any other means that will occur to those of ordinary skill in the art. In an even further embodiment, the means for computing intermediate values for an output image (215) further comprises means for interpolating a phase-corrected, diffraction part of the wavefield. In alternate embodiments, means for interpolating a phase-corrected, diffraction part of the wavefield comprises a computer, a workstation, software running on any computer or workstation, or any other means that will occur to those of ordinary skill in the art. In an even further embodiment, the means for computing a contribution to the wavefield at each intermediate sample point (220) further comprises means for applying a thin lens term to the interpolated wavefield by repeated phase shifts over the output image sample increment. In alternate embodiments, means for applying a thin lens term to the interpolated wavefield by repeated phase shifts over the output image sample increment comprises a computer, a workstation, software running on any computer or workstation, or any other means that will occur to those of ordinary skill in the art. In an even further embodiment, the means for summing the contributions to the wavefield at each intermediate image sample point (225) further comprises means for summing the contributions to the wavefield from each frequency. In alternate embodiments, means for summing the contributions to the wavefield from each frequency comprises a computer, a workstation, software running on any computer or workstation, or any other means that will occur to those of ordinary skill in the art.

In an even further embodiment, the means for extrapolating the data-point-wavefield (205) further comprises means for Marchuk splitting. In alternate embodiments, means for Marchuk splitting comprises a computer, a workstation, software running on any computer or workstation, or any other means that will occur to those of ordinary skill in the art. In an even further embodiment, the system further comprises means for determining an extrapolation interval. In alternate embodiments, means for determining an extrapolation interval comprises a computer, a workstation, software running on any computer or workstation, or any other means that will occur to those of ordinary skill in the art. In an even further embodiment, the means for determining the extrapolation interval comprises means for selecting a fixed size extrapolation interval. In alternate embodiments, means for selecting a fixed size extrapolation interval comprises a computer, a workstation, software running on any computer or workstation, or any other means that will occur to those of ordinary skill in the art. In an even further embodiment, the means for determining the extrapolation interval comprises means for determining a variable size extrapolation interval. In alternate embodiments, means for determining a variable size extrapolation interval comprises a computer, a workstation, software running on any computer or workstation, or any other means that will occur to those of ordinary skill in the art.

In an even further embodiment, the means for correcting the extrapolated wavefield (210) comprises means for applying a preset phase correction after migrating at least one extrapolation interval. In alternate embodiments, means for applying a preset phase correction after migrating at least one extrapolation interval comprises a computer, a workstation, software running on any computer or workstation, or any other means that will occur to those of ordinary skill in the art. In an even further embodiment, the system further comprises means for selecting a limiting value of the preset error tolerance to suit migration accuracy requirements. In alternate embodiments, means for selecting comprises a computer, a workstation, software running on any computer or workstation, or any other means that will occur to those of ordinary skill in the art.

In an even further embodiment, the system further comprises means for imaging. In alternate embodiments, means for imaging comprises a computer, a workstation, software running on any computer or workstation, or any other means that will occur to those of ordinary skill in the art.

While example embodiments of the invention have been described herein, these are example embodiments intended to teach the broad aspect of the invention and in no way are meant to be limiting or exhaustive of the invention.

We claim:

1. A method of migrating seismic data, wherein the seismic data has associated therewith a wavefield at a first level, the method comprising:

extrapolating the wavefield from the first level to a second level;

computing intermediate sample points for an output image between the first and second levels;

interpolating a diffraction part of the wavefield to generate a diffraction part at each intermediate sample point;

calculating a thin lens term for wavefield values interpolated at each intermediate sample point, the thin lens term determined by repeated phase shifts over an output image sample increment; and summing the diffraction part and the thin lens term at each intermediate sample point.

2. The method of claim 1, further comprising transforming the seismic data from the time domain to the temporal-frequency domain prior to the extrapolating and transforming the extrapolated seismic wavefield from the temporal-frequency domain back to the time domain by summing.

3. The method of claim 1, further comprising transforming the seismic data from the spatial domain to the wavenumber domain prior to the extrapolating and transforming the extrapolated seismic wavefield from the wavenumber domain back to the spatial domain prior to the summing.

4. The method of claim 1, wherein the second level is deeper than the first level.

5. The method of claim 1, where the extrapolating further comprises applying a discrete difference equation for the diffracted part of the wavefield to the seismic data.

6. The method of claim 5, wherein the applying a discrete difference equation further comprises generating a phase error for each frequency of the wavefield.

7. The method of claim 6, wherein the phase error further comprises phase error in a diffraction term.

8. The method of claim 6, wherein the correcting the extrapolated wavefield further comprises:

computing an accumulated phase correction for the extrapolated wavefield, when a rapidly-computed estimate of an upper bound for a phase error exceeds a preset error tolerance limit; and applying the accumulated phase correction.

9. The method of claim 1, wherein extrapolating further comprises calculating solutions to the following equations for a diffraction term:

$$(A)P_{i-1,j,k+1,l}{}^2 + (1-2A)P_{i,j,k+1,l}{}^2 + (A)P_{i+1,j,k+1,l}{}^2 = (A^*)P_{i-1,j,k,l}{}^1 + (1-2A)^*P^1_{i,j,k,l} + (A^*)P_{i+1,j,k,l}{}^1,$$

$$A = \frac{\beta_1 \cdot C_{ijk}^2}{4\omega_l^2(\Delta x)^2} + \lambda - \frac{j \cdot \alpha_1}{4} \cdot \frac{C_{ijk}(\Delta z)}{\omega_l(\Delta x)^2}.$$

10. The method of claim 1, wherein extrapolating further comprises calculating solutions to the following equations for a diffraction term:

$$AP_{i,j-1,k+1,l}{}^3 + (1-2A)P_{i,j,k+1,l}{}^3 + (A)P_{i,j+1\ mj+1,l}{}^3 = (A^*)P_{i-1,j,k,l}{}^2 + (1-2A)^*P_{i,j,k,l}{}^2 + (A^*)P_{i,j+1,k,l}{}^2,$$

$$A = \frac{\beta_1 \cdot C_{ijk}^2}{4 \cdot \omega_l^2 \cdot (\Delta y)^2} + \lambda - \frac{j \cdot \alpha_1}{4} \cdot \frac{C_{ijk} \cdot (\Delta z)}{\omega_l \cdot (\Delta y)^2}.$$

11. The method of claim 9, further comprising modifying the equations for a diffraction term to allow extrapolation over constant time intervals, $\Delta t$, by letting $\Delta z = C_{ijk} \cdot \Delta t/2$, wherein $C_{ijk}$ is the propagation velocity at a spatial location $(x_i, y_j, z_k)$.

12. The method of claim 10, further comprising modifying the equations for a diffraction term to allow extrapolation over constant time intervals, $\Delta t$, by letting $\Delta z = C_{ijk} \cdot \Delta t/2$, wherein $C_{ijk}$ is the propagation velocity at a spatial location $(x_i, y_j, z_k)$.

13. The method of claim 1, wherein extrapolating further comprises calculating solutions to the following equations for a diffraction term:

$$A = \frac{\beta_2 \cdot C_{ijk}^2}{4 \cdot \omega_l(\Delta x)^2} + \lambda - \frac{j \alpha_2}{4} \cdot \frac{C_{ijk} \cdot (\Delta z)}{\omega_l \cdot (\Delta x)^2}.$$

14. The method of claim 1, wherein the summing the diffraction part and the thin lens term is performed at each frequency in the wavefield.

15. The method of claim 1, wherein the wavefield further comprises wavefield frequencies of interest.

16. The method of claim 1, wherein the extrapolating the wavefield comprises extrapolating a thin lens term and extrapolating a diffraction term from a first level to a second level, wherein the difference between the first level and the second level defines an extrapolation interval.

17. The method of claim 16, wherein the extrapolating the thin lens term and the extrapolating the diffraction term further comprises extrapolating the thin lens term and the diffraction term in a single phase shift for extrapolation intervals over which a propagation velocity variation is within a pre-selected limit.

18. The method of claim 16, wherein the extrapolating the data-point-wavefield further comprises Marchuk splitting.

19. The method of claim 18, wherein the extrapolating the diffraction term comprises extrapolating a split diffraction term for seismic data points on a constant-y slice and extrapolating a split diffraction term for seismic data points on a constant-x slice.

20. The method of claim 16, wherein the extrapolation interval comprises a depth extrapolation interval.

21. The method of claim 16, wherein the extrapolation interval comprises a time extrapolation interval.

22. The method of claim 1, further comprising determining an extrapolation interval.

23. The method of claim 22, wherein the determining the extrapolation interval comprises selecting a fixed size extrapolation interval.

24. The method of claim 22, wherein the determining the extrapolation interval comprises determining a variable size extrapolation interval.

25. The method of claim 24, wherein the determining the variable size extrapolation interval comprises applying essentially the following equation:

$$\Delta z(z) \leq \frac{0.25 \cdot C_{\min}(z)}{f_{\max}(z) \cdot (1 - \cos\phi)},$$

wherein:

$\Delta z$ comprises an extrapolation interval size beginning at the first level, $C_{min}$ comprises a minimum velocity over all (x,y) at the first level, $f_{max}$ comprises a maximum frequency at the first level, and $\phi$ comprises an estimate of the maximum spatial dip for the entire problem.

26. The method of claim 24, wherein the determining the variable size extrapolation interval comprises applying the following equation:

$$\Delta t(t) \leq \frac{0.50}{f_{\max}(t) \cdot (1 - \cos\phi)},$$

wherein:

$\Delta t$ comprises an extrapolation interval size beginning at time t, $f_{max}$ comprises a maximum frequency at time t, and
φ=an estimate of the maximum spatial dip for the entire problem.

27. The method of claim 25, wherein the selecting the highest wavefield frequency of interest comprises selecting the highest wavefield frequency of interest based on a spectral analysis of the wavefield frequencies.

28. The method of claim 26, wherein the selecting the highest wavefield frequency of interest comprises selecting the highest wavefield frequency of interest based on a spectral analysis of the wavefield frequencies.

29. The method of claim 24, wherein the determining the variable size extrapolation interval further comprises computing the extrapolation interval based on the highest wavefield frequency of interest.

30. The method of claim 1, wherein the correcting the extrapolated wavefield comprises applying a preset phase correction after migrating at least one extrapolation interval.

31. The method of claim 8, wherein the preset error tolerance comprises selecting a limiting value of the preset error tolerance to suit migration accuracy requirements.

32. The method of claim 31, wherein the preset error tolerance is zero.

33. The method of claim 1, further comprising imaging, wherein the imaging comprises computing an imaged contribution of the wavefield at the first level.

34. The method of claim 33, wherein the imaging further comprises summing contributions of the wavefield for all frequencies at the first level.

35. The method of claim 34, wherein the imaging further comprises normalizing the imaged data points.

36. The method of claim 35, wherein the normalizing the imaged data points comprises normalizing the imaged data points using essentially the following equation:

$$I_{i,j,k} = \frac{1}{(l_{max}+1)} \sum_{l=1}^{l_{max}} P_{i,j,k,l}^3.$$

37. A system for migrating seismic data, the system comprising:
means for extrapolating a wavefield;
means for computing intermediate sample points for an output image;
means for interpolating a diffraction part of the wavefield to generate a diffraction part at each intermediate sample point;
means for calculating a thin lens term from wavefield values interpolated at each intermediate sample point, the thin lens term determined by repeated phase shifts over an output image sample increment; and
means for summing the diffraction part and the thin lens term at each intermediate sample point.

38. The system of claim 37, further comprising means for transforming the seismic data from the time domain to the temporal frequency domain and means for transforming the seismic data from the temporal frequency domain to the time domain.

39. The system of claim 37, further comprising means for transforming the seismic data from the spatial domain to the wavenumber domain and means for transforming the seismic data from the wavenumber domain to the spatial domain.

40. The system of claim 37, where the means for extrapolating further comprises means for applying a discrete difference equation.

41. The system of claim 40, wherein the means for correcting the extrapolated wavefield further comprises means for computing an accumulated phase correction for the extrapolated wavefield.

42. The system of claim 37, wherein the means for summing the diffraction part and the thin lens term at each intermediate image sample point is adapted to perform summing at each frequency in the wavefield.

43. The system of claim 37, wherein the means for extrapolating the data-point-wavefield further comprises means for Marchuk splitting.

44. The system of claim 37, further comprising means for determining an extrapolation interval.

45. The system of claim 44, wherein the means for determining the extrapolation interval comprises means for selecting a fixed size extrapolation interval.

46. The system of claim 44, wherein the means for determining the extrapolation interval comprises means for determining a variable size extrapolation interval.

47. The system of claim 37, wherein the means for correcting the extrapolated wavefield comprises means for applying a phase correction after migrating at least one extrapolation interval.

48. The system of claim 37, further comprising means for imaging.

* * * * *